United States Patent [19]

Seeh

[11] 4,345,770
[45] Aug. 24, 1982

[54] COFFERED SEAL

[75] Inventor: Reinhold Seeh, Weinheim an der Bergstrasse, Fed. Rep. of Germany

[73] Assignee: Firma Carl Freudenberg, Weinheim an der Bergstrasse, Fed. Rep. of Germany

[21] Appl. No.: 253,389

[22] Filed: Apr. 13, 1981

[30] Foreign Application Priority Data

Aug. 23, 1980 [DE] Fed. Rep. of Germany ....... 3031870

[51] Int. Cl.³ .......................... F16J 15/24; F16J 15/32
[52] U.S. Cl. ........................................ 277/48; 277/49; 277/151; 277/152
[58] Field of Search ................................... 277/35–37, 277/44–49, 151–153, 166

[56] References Cited

U.S. PATENT DOCUMENTS

| 1,963,465 | 6/1934 | Johnson | 277/49 |
| 2,070,638 | 2/1937 | McCombs | 277/48 |
| 3,099,454 | 7/1963 | Walinski | 277/152 X |
| 4,226,426 | 10/1980 | Messenger | 277/37 |

FOREIGN PATENT DOCUMENTS

| 72655 | 1/1944 | Czechoslovakia | 277/48 |
| 647276 | 7/1937 | Fed. Rep. of Germany | 277/47 |
| 553126 | 5/1943 | United Kingdom | 277/47 |

Primary Examiner—Robert S. Ward, Jr.
Attorney, Agent, or Firm—Kenyon & Kenyon

[57] ABSTRACT

A coffered seal including an inner ring having a U-shaped cross section open radially outward and consisting of two rings of L-shaped cross section facing each other and joined together by bearing sleeve. Within the space embraced by the U-shaped cross section is an outer ring also having a U-shaped cross section open axially and having an outer side and an inner side of frusto-conical shape. Two sealing rings in the space embraced by the cross section of the inner ring having lips that engage opposite surfaces of the frusto-conical inner side of the outer ring at approximately the same diameter to form inner and outer circular seals against the same.

6 Claims, 1 Drawing Figure

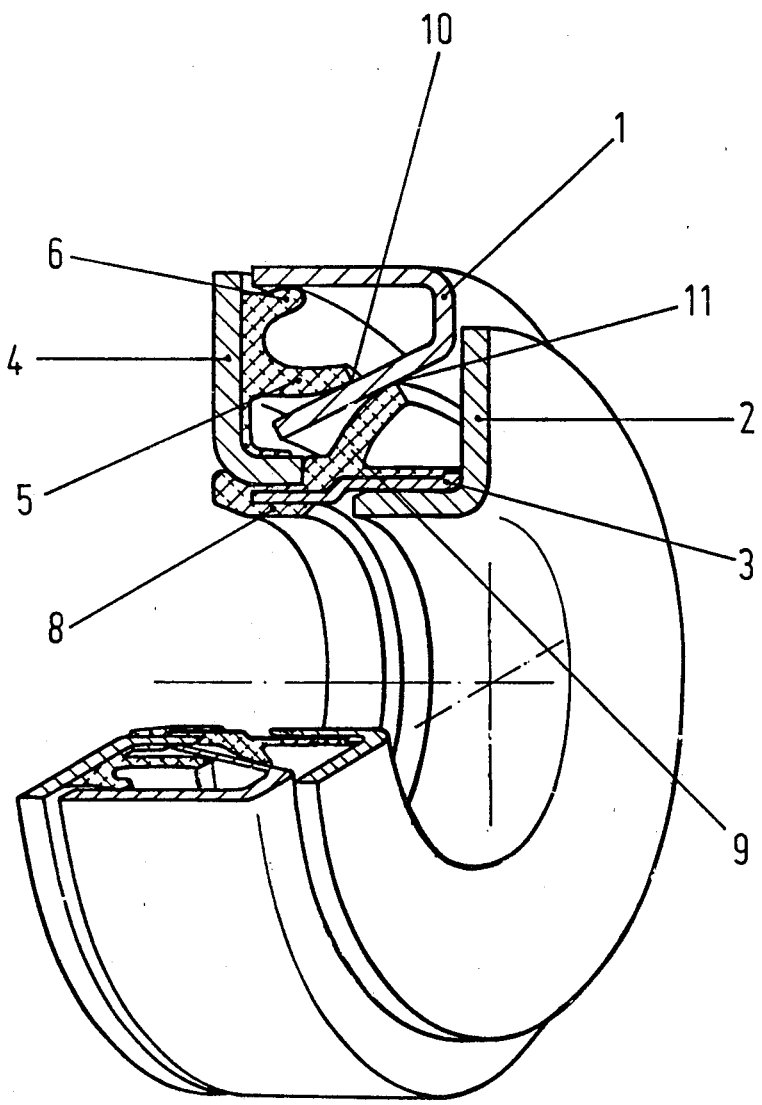

COFFERED SEAL

The invention relates to a coffered seal, consisting of outer and inner rings of sheet metal having angular cross sections that enclose an annular cavity of substantially rectangular cross section, the inner ring having an annular sealing element which protrudes into the cavity and has a sealing lip that rests resiliently against the outer ring.

Coffered seals are frequently used as a seal between the axle and wheel hub of a motor vehicle. In such use, the inner ring of the coffered seal is stationary while the outer ring revolves. During installation, such a coffered seal is likely to be subjected to mechanical loads of considerable magnitude, which impose stress on the seal. In operation, the seal is subjected to continuous exposure to abrasive substances and liquids. Relatively low speeds up to a maximum of about 100 RPM often alternate with long standstill periods, during which dirt that has penetrated can form a crust.

A coffered seal of this general type is described in EP 5707. That seal has a lip ring connected to an inner ring. The lip ring is resilient in the radial direction and rests elastically against the inside circumference of the outer ring. The cross section of the lip ring and the relation to the outer ring must correspond as far as possible to the conditions required for a good seal in installing customary shaft sealing rings. Such highly precise conditions and structural relations, however, can rarely be assured in the vicinity of the wheels hub seals of motor vehicles. Leaks can occur, for instance, if due to excessive bearing play or due to a bent axle, the inner ring is displaced or tilted eccentrically relative to the outer ring.

OBJECTS AND SUMMARY OF THE INVENTION

It is accordingly an object of the invention to develop a coffered seal which can be assembled and disassembled as a closed unit and which ensures a good sealing result even under difficult conditions.

Another object is to provide a good seal of the wheel bearing of a motor vehicle especially if the inner ring is displaced or tilted relative to the outer ring.

A coffered seal according to this invention has an outer ring with a substantially U-shaped cross section open toward the air side and has inner and outer sides. The inner side is a short conical frustum which protrudes at an angle into the annular cavity of the ring. An inner ring of the seal has a substantially U-shaped cross section which is open toward the outside and encloses the outer ring in both axial directions. The sealing means includes a sealing element connected to the inner ring and consisting of two sealing rings, the sealing lips of which are under elastic pretension to press against both surfaces of the inner side of the outer ring.

The inner side of the outer ring is at an angle of about 20° to 50°, preferably about 25° to 45°, relative to the axis of rotation. A relative tilt or center displacement of the outer ring with respect to the inner ring therefore results in no substantial change of the conditions in the vicinity of the sealing lips. It is believed that this is one of the principal causes of the excellent sealing results of this coffered seal under difficult operating conditions.

The easiest way to manufacture the proposed coffered seal is to make the sides of the U-shaped section of the inner ring as three ring sections joined together liquid-tight in the area of the inner circumference. The three ring sections may be detachably connected to each other, which makes a separate replacement of each part of the coffered seal possible after damage or wear has occurred. Forming the parts to have an appropriate shape also makes it possible to introduce a grease charge into the space between the two ealing rings and to replace the grease regularly. A detachable joint of this kind can be constructed, for instance, by providing a press fit in the region of the corresponding surfaces which rest on each other in the radial direction.

However, in view of the extraordinarily long life of this coffered seal, which is at least equivalent to that of sealed roller bearings, an undetachable connection of all ring sections of the inner ring is generally sufficient. Such an undetachable joint also can be formed by appropriate shape of the fitting surfaces which rest against each other. However, it is equally possible to cement, weld or rivet the parts to each other.

The sealing element preferably comprises an additional dust lip which makes contact with the inner surface of the outer side of the outer ring. The dust lip reliably prevents coarse dust from penetrating into the interior of the profile of the outer ring. Due to the rounded profile of the dust lip in the vicinity of the contact zone with the other ring, the removal of dirt that has already penetrated is made easier.

The length of the profile of the sealing rings extending into the annular cavity is matched so that the sealing lips on both sides rest on the inner side of the outer ring at approximately the same nominal diameter. The sealing rings are arranged on the inner side and on the side facing the outside air of the inner ring, and in the unassembled condition, their profile is approximately perpendicular thereto. In their assembled state, they are elastically bent over, the amount of bending depending on the relation of the outer ring to the inner ring. Since the outer ring is nestled in the U-shaped inner ring, it is not possible to get an idea of the order of magnitude of the displacement impairment of the effectiveness of the seal can be expected. The proposed seal is largely insensitive to radial displacement or to tilting.

Additional protection can be obtained if the inner ring or the outer ring is connected to the receiving machine part by an elastic intermediate layer, for instance, to the shaft or the hub. An automatic adjustment can be obtained by such an elastic intermediate layer, provided it is thick enough, especially if virbrations are introduced, so that after a short period of operation, the outer ring and the inner ring assume an optimum mutual relation. Also contributing substantially to this effect is the mutual relation of the two sealing rings, the resultant opposing forces of which are cancelled completely only when there is such an optimized mutual relationship.

The drawing shows one embodiment of a coffered seal of this invention in a partial-cross-sectional perspective view.

DETAILED DESCRIPTION OF THE INVENTION

The coffered seal consists of an outer ring 1, that has a U-shaped cross section, open toward the air side, and has an inward-pointing, frusto-conical side which is at an angle of about 20° to 50°, preferably 25° to 45° to the axis of rotation.

The inner ring is divided into three parts and consists of a coffer ring 2 facing the sealed medium, a generally cylindrical bearing sleeve 3, and a dirt guard 4. The ring 2 and the dirt guard 4 have L-shaped cross sections and each includes a radial flange and a cylindrical portion. The three ring sections are joined together undetachably by a pressed fit with the cylindrical portions of the ring 2 and dust guard 4 facing each other. They are made independently of each other in separate operations.

The coffer ring 2, which is firmly connected to the bearing sleeve 3, has an inside diameter that allows it to be pushed loosely onto the sealed shaft. The sealing, proper, in this region against the sealed medium is accomplished by a rubber layer 8, vulcanized onto the bearing sleeve 3 and press-fitted onto the sealed shaft. The inside of the layer 8 may have circular ribs or depressions which are arranged axially one behind the other to improve static effect and to facilitate automatic self-adjustment of the inner ring relative to the outer ring.

The bearing sleeve and the dirt guard are provided with sealing rings 5 and 9. The ring 5 has a sealing lip 10 and the ring 9 has a lip 11. These lips press elastically on opposite surfaces of the inward-pointing frusto-conical side of the outer ring 1. In the assembled condition, both of the elastomeric sealing lips 10 and 11 have the same nominal diameter. Diameter displacements of the contacting sealing lip are possible practically along the entire length of the frusto-conical side of the outer ring 1 without interfering with the sealing function of the elastic sealing lips.

The outer ring 1 and the bearing sleeve 3, respectively, are anchored in the hub and on the shaft, respectively, by press fits and are sealed. The strength of the press fits results directly from the dimensional match of the contacting diameters, and an expert will therefore encounter no difficulty in giving strength of defined and, if desired, different magnitude to the resulting joint in the press fit. In the coffered seal of this invention, the coffer ring 2, the bearing sleeve 3 and the dirt guard 4 are joined together by a very strong press fit. The press fit between the outer ring 1 and the take-up projection has less strength and the press fit between the bearing sleeve 3 and the shaft has even more reduced strength. The strength of the last-mentioned joints is preferably staggered in steps. The proposed coffered seal can therefore be assembled and disassembled as a whole. After installation in the wheel hub, the coffered seal can be pushed onto, or pulled off, the shaft together with the hub, and this can also be done repeatedly. No impairment of the function has been observed when that was done.

It is possible to increase the contact pressures of the sealing lips on both sides by installing a ring coil spring similar to the structure shown in EP 5707. Such measures, however, have been found unnecessary in practice, if the frusto-conical inner side of the outer ring is at an angle of 20° to 50° with respect to the axis and preferably at an angle of 25° to 45°.

The dirt guard also has a circular dust lip 6 that has a rounded elastomeric sealing lip on the inside circumference of the outer side of the outer ring. The special form of the dirt guard makes it possible for dirt that has penetrated into the space between the two sides of the outer ring 1 to escape under the influence of water and dust through the gap 7 into the annular cavity of the coffered seal.

What is claimed:

1. A coffered seal comprising:
   an outer ring of sheet metal having a substantially U-shaped cross section open toward one axial direction and comprising an outer side and an inner side that extends at an angle of approximately 20° to 50° relative to the axis of the ring;
   inner ring means comprising a multi-part structure defining a U-shaped cross section extending axially beyond the outer ring in both axial directions to enclose the outer ring; and
   first and second elastomeric sealing rings comprising first and second sealing lips, respectively, within the U-shaped cross section of the inner ring and bearing against opposite surfaces of the inwardly extending side of the outer ring.

2. The invention according to claim 1 in which the inner side of the outer ring is substantially frusto-conical, and the sealing lips extend toward the inner side from opposite axial directions.

3. The invention according to claim 2 in which the inner side of the outer ring makes an angle of approximately 25° to 45° relative to the axis of rotation.

4. The invention according to claim 1 in which the inner ring comprises first and second end members, each comprising a generally radial flange portion and a generally cylindrical portion extending toward each other, and a bearing sleeve joining the cylindrical portions to form a seal therebetween.

5. The invention according to claim 1 in which the sealing element comprises an additional elastomeric dust lip that rests on the inner surface of the outer side of the outer ring entirely around the circumference thereof.

6. The invention according to claim 1 in which the first sealing lip has a diameter substantially equal to the diameter of the second sealing lip, whereby press against the sealing lips opposite surfaces of a common part of the inner side of the outer ring.

* * * * *